United States Patent [19]

Tobin

[11] 4,016,229
[45] Apr. 5, 1977

[54] CLOSED-CELL CERAMIC FOAM MATERIAL

[75] Inventor: Albert G. Tobin, Smithtown, N.Y.

[73] Assignee: Grumman Aerospace Corporation, Bethpage, N.Y.

[22] Filed: Nov. 19, 1973

[21] Appl. No.: 417,361

[52] U.S. Cl. .............................. 264/63; 106/40 V; 106/52; 106/DIG. 1; 264/66; 264/125

[51] Int. Cl.$^2$ ................ C04B 33/32; C04B 35/64; C04B 35/81

[58] Field of Search ................ 264/43, DIG. 6, 42, 264/63; 106/52, 74, 75, 288 B, 40, DIG. 1, DIG. 2, DIG. 3, 122; 161/DIG. 6

[56] References Cited

UNITED STATES PATENTS

| | | | |
|---|---|---|---|
| 2,890,126 | 6/1959 | Ford | 264/43 X |
| 3,425,577 | 2/1969 | Copley et al. | 106/52 X |
| 3,458,332 | 7/1969 | Alford et al. | 106/52 |
| 3,459,630 | 8/1969 | D'Eustachio et al. | 264/43 X |
| 3,486,872 | 12/1969 | Wojcik et al. | 264/43 X |
| 3,782,985 | 1/1974 | Gebhardt | 106/DIG. 1 |
| 3,830,776 | 8/1974 | Carlson et al. | 106/DIG. 1 X |
| R25,564 | 4/1964 | Alford et al. | 264/DIG. 6 |

OTHER PUBLICATIONS

Raask, J. of the Institute of Fuel, Sept., 1968, pp. 339–344.

Primary Examiner—Joan E. Welcome
Attorney, Agent, or Firm—Morgan, Finnegan, Pine, Foley & Lee

[57] ABSTRACT

Cenospheres have been formed into a closed-cell ceramic foam by the application of heat. The closed-cell ceramic foam has excellent insulating properties, is readily machinable, and has cohesive structure which makes it useful for high-temperature insulating applications such as heat shields to protect space vehicles when they re-enter the earth's atmosphere.

14 Claims, No Drawings

CLOSED-CELL CERAMIC FOAM MATERIAL

This invention relates to a novel closed-cell ceramic foam material that is prepared by heating cenospheres for a sufficient period of time and at a temperature sufficiently high enough to cause the walls thereof to soften such that the spheres are caused to "foam" by their internal fluid pressure and form a cohesive waterproof material.

BACKGROUND OF THE INVENTION

This invention provides a novel structural unit that is derived from a glassy material which comprises glass microballoons. Glass structural units have been prepared in the prior art by sintering a mass of hollow glass particles to fuse the skins at their points of contact so that a structural unit is formed which is porous and not waterproof. These are disclosed in U.S. Pat. Nos. Re 25,564 and 3,458,332. The present invention is a closed pore, waterproof, substantially rigid material which has excellent insulating properties.

Cenospheres are cellulated glass microballoons or spherical, hollow glass particles which are a component of the fly ash obtained from the combustion of coal. They are described in detail by Raask, J. of the Institute of Fuel, pp. 339–344 (September, 1968) which is hereby incorporated by reference. The present invention provides a novel procedure for making a novel structural unit from cenospheres. This structural unit may be used as an insulating material for aerospace and other applications.

The novel closed-pore ceramic resists slag corrosion and gas erosion. It has high compressive strength and is readily machinable and can be fabricated into any desired size or shape using conventional techniques.

DESCRIPTION OF THE INVENTION

The closed-pore ceramic foam is prepared by heating cenospheres in the presence of air or any inert or unreactive atmosphere at a sufficiently high temperature for a sufficient length of time to form a coherent material having a bulk density of at least 31 lb/ft$^3$, and preferably in the range of 40 lb/ft$^3$ to 60 lb/ft$^3$. The untreated cenospheres are obtained as a loose-flowing powder that is first placed in a refractory mold that has the configuration of the article which is being prepared. Thereafter, the mold is placed in a furnace or kiln and fired to form the closed-cell ceramic foam.

In the invention, the firing temperatures are critical and depend on the chemistry of the system. Firing temperatures in the range of about 2470° F to about 3000° F are preferred. The furnace temperature initially should be raised slowly at a rate of 200° F to 400° F per hour until a temperature has been reached such that any organic binder used is burned off slowly and any carbonates (or other decomposable compounds) are decomposed. This temperature is usually about 1000° F and is maintained for a time period ranging from about 0.5 hour to about 5 hours, preferably for about 1 hour. Then, in what may be termed a second stage of the firing process, the furnace temperature is raised at a rate of 350° F to 550° F per hour and is held at the desired peak temperature until the mass of cenospheres shrink to form a closed pore ceramic foam. In the invention, a firing cycle of about 24–30 hours usually is employed and a peak temperature level is maintained for a period of about 0.25 hour to 1.5 hours, preferably 0.5 hours.

The cenospheres may be used directly after recovery from fly ash, but it is preferred to first pretreat them by either a decrepitation or separation procedure or both. These steps may be carried out in either sequence.

The decrepitation procedure is essentially a heat treatment to drive off water which is contained in the cenospheres. It is usually carried out by heating the cenospheres in a tray to a temperature at which a crackling noise is heard. This will be accomplished by a heating cycle of 0.5 to 2 hours at a temperature of 600°–1000° F, preferably at about 900° F.

The cenospheres as recovered from fly ash usually have diameters in the range of 20–200 micrometers and a shell thickness of 2–10 micrometers.

The cenospheres obtained from England or domestic sources have the following chemical analysis (wt. %).

| Constituent | English | Domestic |
| --- | --- | --- |
| $Al_2O_3$ | 31.97 | 33.25 |
| $SiO_2$ | 60.75 | 61.60 |
| $Fe_2O_3$ | 4.18 | 3.16 |
| $K_2O$ | 1.91 | 1.44 |
| $Na_2O$ | 0.81 | 0.59 |

To enhance the physical properties of the closed-cell ceramic foam, the cenospheres may be separated to obtain a fraction with diameters in the range of 50–100 micrometers, or a bulk density of less than 22 lb/ft$^3$, preferably about 20 lb/ft$^3$. The separation may be carried out by placing the cenospheres in a liquid having a density less than water, allowing the heavier fraction to sink and collecting the floating fraction. Suitable liquids include hexane, heptane and other organic solvents with a density of less than about 0.95. This procedure also removes other undesirable impurities or dense particulate matter.

A temporary organic binder may be employed to hold the unfired cenospheres in a closely held relation to one another. Materials such as aqueous dispersions of gum arabic, polyvinyl alcohol or glycerin, carbowax, starch, naphthalene or mixtures thereof with water may be employed as binders, although other temporary organic binders that are well known in the ceramic art may be used.

When a binder is used, a small amount of the binder is mixed with the cenospheres and they are placed in a mold or die to be formed into the desired shape. Thereafter, the shaped mass is dried, e.g., in an oven at 200° F and subsequently fired to form the closed-pore ceramic foam.

To enhance the thermal and optical properties of the insulating compositions of this invention, a high-emittance high infrared absorber may be added to increase the normal high-temperature emittance and reduce thermal conductivity of the closed-pore ceramic foam. These additives also act as a flux that reacts to soften the shell walls during the firing operation with a resulting increase in cell size that promotes formation of the closed-pore ceramic foam and produces changes in the thermal, mechanical, and chemical properties that can be utilized in the various applications thereof.

The additives may be selected from transition metal compounds and rare earth compounds. The oxides, sulfates, carbonates, nitrates, etc., of iron, cobalt, nickel, cerium, and phraseodynium, etc. may be used. Transition metal and rare earth carbonates are preferred. These compounds are well known and may be selected from Lange's Handbook of Chemistry, 5th Ed., Handbook Publishers, Inc., Sandusky, Ohio (1944) pp. 155–265, which is hereby incorporated by reference.

Generally, it is preferred to employ as the compound an oxide and this may be used directly or prepared in situ from the carbonate which is transformed to the oxide during the heating step. The preferred materials are the carbonates of iron, nickel and cobalt. These materials may be employed at from 0.1 to 30% by weight of total composition and preferably at a level of 2 to 15% by weight.

The closed-pore ceramic foam may be used as an insulation panel or structural member for a wide variety of applications. These applications include heat shields for space vehicles, building panels, high-temperature furnace bricks and other applications where a non-combustible insulation is employed.

The thermal conductivity of the closed-pore ceramic foam varies between 0.9 and 2.7 BTU in./hr/ft$^2$/° F depending on composition and density and temperature. The three-point bend strength varies between 400–2500 p.s.i. depending on density and chemistry. The compressive strength varies between 2700–9300 p.s.i. depending on density and chemistry and the average expansion coefficient is $24 \times 10^{-7}$/° F from room temperature to 2000° F.

DESCRIPTION OF THE PREFERRED EMBODIMENTS

The methods and compositions within the scope of the invention are illustrated by the following examples which are set forth as a further description of the invention, but are not to be construed as limiting the invention thereto.

EXAMPLE

20–30 pounds of West Virginia cenospheres are placed in ten 8 × 10 steel trays and covered with aluminum foil. The covered trays are placed in an electric kiln furnace which is heated to 900° F over a 2-hour period. The heating is continued at 900° F for 12 hours. The decrepitated cenospheres are removed from the furnace and allowed to cool.

The cooled, decrepitated cenospheres are poured into a glass beaker that is filled with n-heptane. After 2–3 minutes, the spheres separate into a floating layer and a sinking layer. The floating spheres are skimmed from the surface with a ladle and placed in a Buechner funnel lined with filter paper. The drained cenospheres are removed and allowed to air dry in a vented hood.

1.3 lb. of separated and decrepitated cenospheres are mixed with 0.17 lb. of cobalt carbonate and passed several times through a 20 and 40 mesh sieve. To the sieved mixture is then added 0.25 lb. of a binder which consists of 20% polyvinyl alcohol and 4% glycerin in water (w/w). The binder is blended to the cenospheres and cobalt carbonate for 5 minutes in a Hobart blender at maximum speed.

The blended mixture is passed again through a 20 and 40 mesh sieve and, thereafter, placed in a 9¼ × 9¼ × 1¼ mold with a Formica liner. The mold is placed in a press and a block is formed by applying a pressure of 125 p.s.i. The block is removed from the mold and dried in an oven at 200° F for 8 hours.

After drying the block is placed in a fused silica muffle that is fitted with a thermocouple insert. The base of the muffle is covered with an alumina grog to prevent sticking and the block is fired in an electric kiln or gas fired kiln according to the following cycle:
 a. Room temperature to 1000° F at 333° F/hr.
 b. Hold at 1000° F for 1 hour
 c. 1000°–2500° F at 550° F/hr.
 d. Hold at 2500° F for 0.5 hr.

Thereafter, the furnace is shut down and allowed to cool prior to removing the closed-pore ceramic foam.

Obviously, other modifications and variations of the present invention are possible in the light of the above teachings. It is therefore, to be understood that changes may be made in the particular embodiments of the invention described which are within the full intended scope of the invention as defined by the appended claims.

I claim:

1. A method of making a closed-pore ceramic foam material which comprises firing cenospheres having a predetermined shape in a firing cycle during which the temperature is increased from 200° F to 600° F per hour over a period of 6 to 8 hours to a maximum temperature of from about 2470° F to about 3000° F and holding the temperature at that level for 0.25 to 1.5 hours to cause the cenospheres to shrink and form a closed-pore ceramic foam having a density of at least 31 lb/ft$^3$.

2. The method of claim 1 wherein said cenospheres are held for 0.5 to 1.5 hours at temperatures ranging from 500° F to 1500° F before the maximum firing temperature is attained.

3. The method of claim 1 wherein said cenospheres are first decrepitated prior to firing.

4. The method of claim 1 wherein the decrepitated cenospheres are separated prior to firing to obtain a fraction having a density of less than 22 lb/ft$^3$.

5. The method of claim 1 wherein the cenospheres are decrepitated by heating at a temperature of from about 600° – 1000° F for a sufficient period of time.

6. The method of claim 4 wherein the cenospheres are decrepitated at about 900° F.

7. The method of claim 3 wherein the separation is effected by flotation of the cenospheres in an organic liquid having a density less than water.

8. The method of claim 3 wherein the separation is effected by flotation of the cenospheres in heptane.

9. The method of claim 1 wherein prior to firing, a temporary organic binder is used to form the cenospheres into a predetermined shape.

10. The method of claim 9 wherein the temporary organic binder is selected from the group consisting of gum arabic, polyvinyl alcohol, glycerin, naphthalene, starch and mixtures thereof.

11. The method of claim 3 wherein said cenospheres are admixed prior to firing with from 0.1 to 30% by weight of an additive selected from the group consisting of transition metal compounds and rare earth compounds.

12. The method of claim 10 wherein said additive is a transition metal oxide or rare earth oxide.

13. The method of claim 11 wherein said additive is a transition metal or rare earth carbonate.

14. The method of claim 11 wherein said transition metal compound is an oxide of cobalt, nickel or iron.

* * * * *